US009882687B2

(12) United States Patent
Park et al.

(10) Patent No.: US 9,882,687 B2
(45) Date of Patent: Jan. 30, 2018

(54) METHOD OF PACKET CLASSIFICATION FOR 802.11AX

(71) Applicant: INTEL IP CORPORATION, Santa Clara, CA (US)

(72) Inventors: Minyoung Park, Portland, OR (US); Thomas J. Kenney, Portland, OR (US); Eldad Perahia, Portland, OR (US); Robert Stacey, Portland, OR (US); Shahrnaz Azizi, Cupertino, CA (US)

(73) Assignee: INTEL IP CORPORATION, Santa Clara, CA (US)

( * ) Notice: Subject to any disclaimer, the term of this patent is extended or adjusted under 35 U.S.C. 154(b) by 275 days.

(21) Appl. No.: 14/667,965

(22) Filed: Mar. 25, 2015

(65) Prior Publication Data
US 2016/0285596 A1    Sep. 29, 2016

(51) Int. Cl.
| | |
|---|---|
| H04L 5/00 | (2006.01) |
| H04L 1/00 | (2006.01) |
| H04L 27/00 | (2006.01) |
| H04L 27/26 | (2006.01) |
| H04W 84/12 | (2009.01) |
| H04L 27/02 | (2006.01) |
| H04L 27/18 | (2006.01) |

(52) U.S. Cl.
CPC ............ *H04L 5/003* (2013.01); *H04L 1/00* (2013.01); *H04L 5/0046* (2013.01); *H04L 5/0094* (2013.01); *H04L 27/0008* (2013.01); *H04L 27/2613* (2013.01); *H04L 5/0007* (2013.01); *H04L 27/02* (2013.01); *H04L 27/18* (2013.01); *H04W 84/12* (2013.01)

(58) Field of Classification Search
CPC ...... H04L 5/003; H04L 5/0046; H04L 5/0094; H04L 27/0008; H04L 27/2613
See application file for complete search history.

(56) References Cited

U.S. PATENT DOCUMENTS

| | | | |
|---|---|---|---|
| 2009/0164638 A1 | 6/2009 | Jang et al. | |
| 2011/0006824 A1* | 1/2011 | Kang ............... | H04W 52/0229 327/175 |
| 2013/0107912 A1 | 5/2013 | Ponnampalam | |
| 2013/0107990 A1* | 5/2013 | Zhang ............... | H04L 27/2613 375/329 |
| 2013/0121244 A1* | 5/2013 | Vermani ............ | H04L 1/0029 370/328 |
| 2013/0322363 A1 | 12/2013 | Chen et al. | |

(Continued)

FOREIGN PATENT DOCUMENTS

WO    WO 2015/009846    1/2015

OTHER PUBLICATIONS

U.S. Appl. No. 14/581,259, filed Dec. 23, 2014, Park et al.
(Continued)

*Primary Examiner* — Michael Thier
*Assistant Examiner* — Brian P Cox
(74) *Attorney, Agent, or Firm* — Jason H. Vick; Sheridan Ross, PC

(57) ABSTRACT

Techniques for packet classification for IEEE 802.11ax capable devices are provided. Specifically, methods are presented, that when taken alone or together, provide a device or group of devices with a means for determining the modulation and coding scheme used, through robust bit indication in a WLAN 802.11ax frame.

22 Claims, 9 Drawing Sheets

(56) References Cited

U.S. PATENT DOCUMENTS

| | | | |
|---|---|---|---|
| 2014/0038657 A1 | 2/2014 | Jo et al. | |
| 2014/0119410 A1* | 5/2014 | Tian | H04B 1/707 375/146 |
| 2014/0307649 A1* | 10/2014 | Vermani | H04L 5/0044 370/329 |
| 2014/0369276 A1 | 12/2014 | Porat et al. | |
| 2016/0088126 A1* | 3/2016 | Doan | H04L 69/22 370/329 |
| 2016/0127233 A1* | 5/2016 | Wentink | H04W 72/1289 370/392 |
| 2016/0227436 A1* | 8/2016 | Vermani | H04W 28/06 |

OTHER PUBLICATIONS

IEEE Computer Society "Part II: Wireless LAN Medium Access Control (MAC) and Physical Layer (PHY) Specifications: Amendment 4: Enhancements for Very High Throughput for Operation in Bands below 6GHz" IEEE Std 802.11ac—2013.

Sony "MTC Operation with a Narrowband PDCCH" 3GPP TSG-RAN WG1 Meeting #79; R1-145018; San Francisco, Nov. 17-21, 2014.

International Search Report for corresponding International Application No. PCT/US2016/017687, dated Jul. 11, 2016.

Written Opinion for corresponding International Application No. PCT/US2016/017687, dated Jul. 11, 2016.

International Search Report for corresponding International Application No. PCT/US2015/062099, dated Feb. 29, 2016.

Written Opinion for corresponding International Application No. PCT/US2015/062099, dated Feb. 29, 2016.

International Preliminary Report on Patentability for corresponding International Application No. PCT/US2016/017687, dated Oct. 5, 2017.

\* cited by examiner

Fig. 5

| L-STF | L-LTF | L-SIG | Payload |

504, 508, 512, 516; Preamble 514; 500

Fig. 6

| L-STF | L-LTF | L-SIG | HT-SIG | HT-STF | HT-LTF | Payload |

604, 608, 612, 616, 620, 624, 628; Preamble 614; HT Portion 626; 600

Fig. 7

| L-STF | L-LTF | L-SIG | VHT-SIG-A | VHT-STF | VHT-LTF | Payload |

704, 708, 712, 716, 720, 724, 728; Preamble 714; VHT Portion 726; 700

METHOD OF PACKET CLASSIFICATION FOR 802.11AX

TECHNICAL FIELD

Embodiments pertain to wireless networks. Some embodiments relate to wireless networks that operate in accordance with one of the IEEE 802.11 Standards including the IEEE 802.11-2012 standards. Exemplary embodiments also relate to Wireless Local Area Network (WLAN) frames with coding and modulation classification.

BACKGROUND

Consumer electronics are rapidly evolving towards a network of Internet of Things. As such, compatibility between devices and standards is of upmost importance. Devices need to be able to communicate and identify information generated for the specific device and/or for the legacy device. To facilitate the coexistence of old and new devices, standards specifications are being developed such that, for example, a communication device or STA can receive a WLAN frame and either process or defer processing based on the information contained within the frame. In IEEE 802.11ax for example, On-Off Keying (OOK) and 8 times repetition (Rep8) coding was proposed to resolve the link-budget imbalance problem. However, packet classification with information regarding the use of OOK/Rep8 does not currently exist.

A number of issues arise from this scenario. One issue is the inability for a legacy device to properly defer transmission upon reception of a WLAN 802.11 ax frame. Another issue includes improper processing of a WLAN 802.11ax frame as legacy, OOK, or Rep8. Still another issue includes the added cost to system processing in determining correct modulation and/or coding when not identified within the frame. It is with these and other considerations that the present improvements have been developed.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIG. 5 illustrates an exemplary IEEE 802.11 legacy frame;

FIG. 6 illustrates an exemplary High Throughput (HT) Packet Format;

FIG. 7 illustrates an exemplary Very High Throughput (VHT) Packet Format;

DESCRIPTION OF EMBODIMENTS

Figure 1:
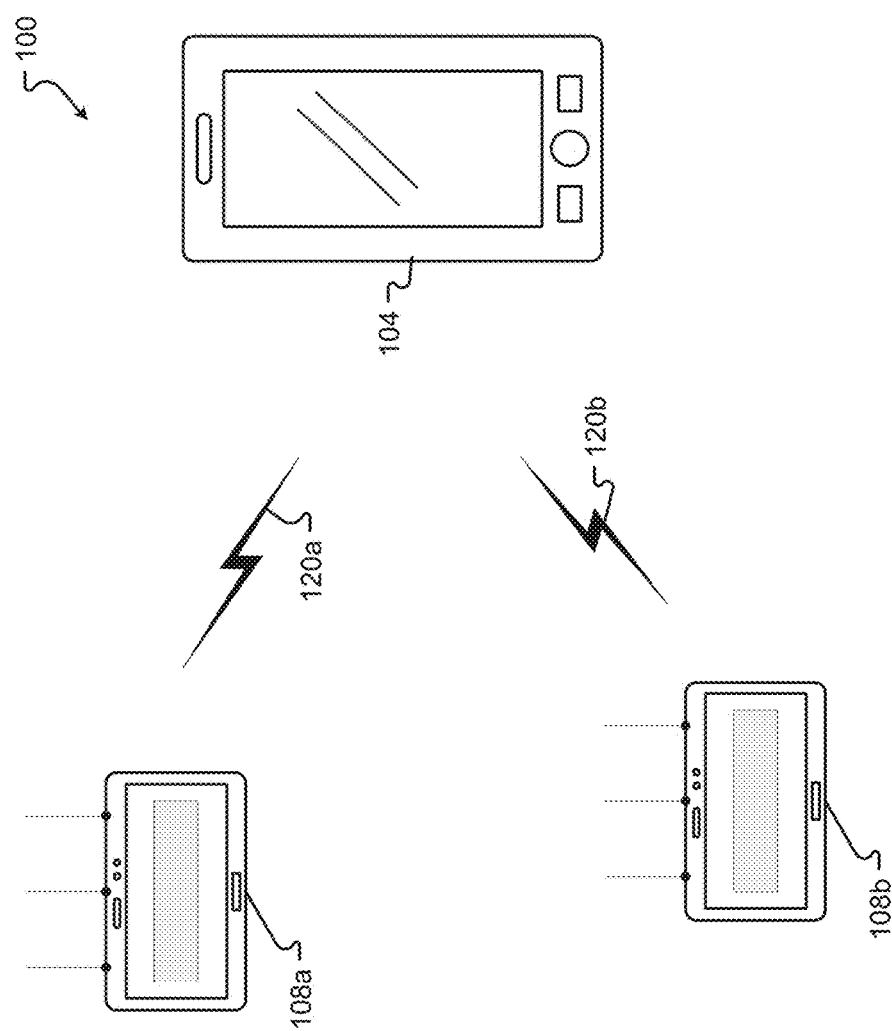
FIG. 1 illustrates an exemplary wireless network environment.

In the following detailed description, numerous specific details are set forth in order to provide a thorough understanding of the disclosed techniques. However, it will be understood by those skilled in the art that the present embodiments may be practiced without these specific details. In other instances, well-known methods, procedures, components and circuits have not been described in detail so as not to obscure the present disclosure.

Although embodiments are not limited in this regard, discussions utilizing terms such as, for example, "processing," "computing," "calculating," "determining," "establishing", "analyzing", "checking", or the like, may refer to operation(s) and/or process(es) of a computer, a computing platform, a computing system, a communication system or subsystem, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

Although embodiments are not limited in this regard, the terms "plurality" and "a plurality" as used herein may include, for example, "multiple" or "two or more". The terms "plurality" or "a plurality" may be used throughout the specification to describe two or more components, devices, elements, units, parameters, circuits, or the like.

Before undertaking the description of embodiments below, it may be advantageous to set forth definitions of certain words and phrases used throughout this document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, interconnected with, contain, be contained within, connect to or with, couple to or with, be communicable with, cooperate with, interleave, juxtapose, be proximate to, be bound to or with, have, or the like; and the term "controller" means any device, system or part thereof that controls at least one operation, such a device may be implemented in hardware, circuitry, firmware or software, or combination of at least two of the same. It should be noted that the functionality associated with any particular controller may be centralized or distributed, whether locally or remotely. Definitions for certain words and phrases are provided throughout this document and those of ordinary skill in the art should understand that in many, if not most instances, such definitions apply to prior, as well as future uses of such defined words and phrases.

The exemplary embodiments will be described in relation to communications systems, as well as protocols, techniques, means and methods for performing communications, such as in a wireless network, or in general in any communications network operating using any communications protocol(s). Examples of such are home or access networks, wireless home networks, wireless corporate networks, and the like. It should be appreciated however that in general, the systems, methods and techniques disclosed herein will work equally well for other types of communications environments, networks and/or protocols.

For purposes of explanation, numerous details are set forth in order to provide a thorough understanding of the present techniques. It should be appreciated however that the present disclosure may be practiced in a variety of ways beyond the specific details set forth herein. Furthermore, while the exemplary embodiments illustrated herein show various components of the system collocated, it is to be appreciated that the various components of the system can be located at distant portions of a distributed network, such as a communications network, node, and/or the Internet, or within a dedicated secured, unsecured, and/or encrypted system and/or within a network operation or management device that is located inside or outside the network. As an example, a wireless device can also be used to refer to any device, system or module that manages and/or configures or communicates with any one or more aspects of the network or communications environment and/or transceiver(s) and/or stations and/or access point(s) described herein.

Thus, it should be appreciated that the components of the system can be combined into one or more devices, or split between devices, such as a transceiver, an access point, a station, a network operation or management device, a node or collocated on a particular node of a distributed network, such as a communications network. As will be appreciated from the following description, and for reasons of computational efficiency, the components of the system can be arranged at any location within a distributed network without affecting the operation thereof.

Furthermore, it should be appreciated that the various links, including the communications channel(s) connecting the elements can be wired or wireless links or any combination thereof, or any other known or later developed element(s) capable of supplying and/or communicating data to and from the connected elements. The term module as used herein can refer to any known or later developed hardware, circuitry, software, firmware, or combination thereof, that is capable of performing the functionality associated with that element. The terms determine, calculate, and compute and variations thereof, as used herein are used interchangeably and include any type of methodology, process, technique, mathematical operational or protocol.

Moreover, while some of the exemplary embodiments described herein are directed toward a transmitter portion of a transceiver performing certain functions, this disclosure is intended to include corresponding and complementary receiver-side functionality in both the same transceiver and/or another transceiver(s), and vice versa.

The IEEE 802.11 standard specifies a common Medium Access Control (MAC) Layer which provides a variety of functions that support the operation of IEEE 802.11-based wireless LANs (WLANs). The MAC Layer manages and maintains communications between IEEE 802.11 stations (such as between radio network cards (NIC) in a PC or other wireless devices or stations (STA) and access points (APs)) by coordinating access to a shared radio channel and utilizing protocols that enhance communications over a wireless medium.

IEEE 802.11n was introduced in 2009 and improved the maximum single-channel data rate from 54 Mbps of 802.11g to over 100 Mbps. IEEE 802.11n also introduced MIMO (multiple input/multiple output or spatial streaming), where, according to the standard, up to 4 separate physical transmit and receive antennas carry independent data that is aggregated in a modulation/demodulation process in the transceiver. (Also known as SU-MIMO (single-user multiple input/multiple output.))

The IEEE 802.11ac specification operates in the 5 GHz band and adds channel bandwidths of 80 MHz and 160 MHz with both contiguous and non-contiguous 160 MHz channels for flexible channel assignment. 802.11 ac also adds higher order modulation in the form of 256 quadrature amplitude modulation (QAM), providing a 33-percent improvement in throughput over IEEE 802.11n technologies. A further doubling of the data rate in IEEE 802.11ac is achieved by increasing the maximum number of spatial streams to eight.

IEEE 802.11 ac further supports multiple concurrent downlink transmissions ("multi-user multiple-input, multiple-output" (MU-MIMO)), which allows transmission to multiple spatial streams to multiple clients simultaneously. By using smart antenna technology, MU-MIMO enables more efficient spectrum use, higher system capacity and reduced latency by supporting up to four simultaneous user transmissions. This is particularly useful for devices with a limited number of antennas or antenna space, such as smartphones, tablets, small wireless devices, and the like. IEEE 802.11 ac streamlines the existing transmit beamforming mechanisms which significantly improves coverage, reliability and data rate performance.

IEEE 802.11 ax is the successor to 802.11 ac and is proposed to increase the efficiency of WLAN networks, especially in high density areas like public hotspots and other dense traffic areas. IEEE 802.11ax will also use orthogonal frequency-division multiple access (OFDMA). Related to IEEE 802.11ax, the High Efficiency WLAN Study Group (HEW SG) within the IEEE 802.11 working group is considering improvements to spectrum efficiency to enhance system throughput/area in high density scenarios of APs (Access Points) and/or STAs (Stations).

Some embodiments relate to a communication device and/or communication system are presented. The communication system can include Wireless Local Area Network (WLAN) enabled device and/or communication system. The communication system can include communication devices capable of operating in accordance with IEEE 802.11 ax standards. The communication devices are further capable of identifying and processing a WLAN 802.11ax frame with modulation and coding identification. The overall design and functionality of the system and process is described herein is, as one example, to at least provide a more efficient means for identifying the frame transmitted.

Embodiments provide novel networking mechanisms that facilitate a process for obtaining modulation and coding information. A technique for determining whether a legacy frame or frame with equivalent OOK modulation and/or Rep8 coding is used in WLAN IEEE 802.11ax devices is also presented. Other advantages exist as well as will be discussed herein.

A wireless network environment 100 is shown in FIG. 1. The wireless network environment 100 can include communication between a wireless device 104 and one or more communication devices 108a, 108b. The wireless device 104 can be a mobile device, including but not limited to, a mobile phone, a mobile computer, a smart phone, a laptop, a netbook, a personal digital assistant, a tablet, receiver, or in genera any wireless device, etc. The communication devices 108 can be an access point, a smart phone, or any entity that has station (STA) functionality and provides access to distributing services, etc. The communication between the wireless device 104 and the communication devices 108 can occur using communication channel(s) 120a, 120b. The communication device 108 can, for example, transmit data, video, frames, etc., to the wireless device 104 within a proximity of the communication device 108. The communication between devices 104 and 108 can at least include communication over a Wireless Local Area Network (WLAN).

Figure 2:
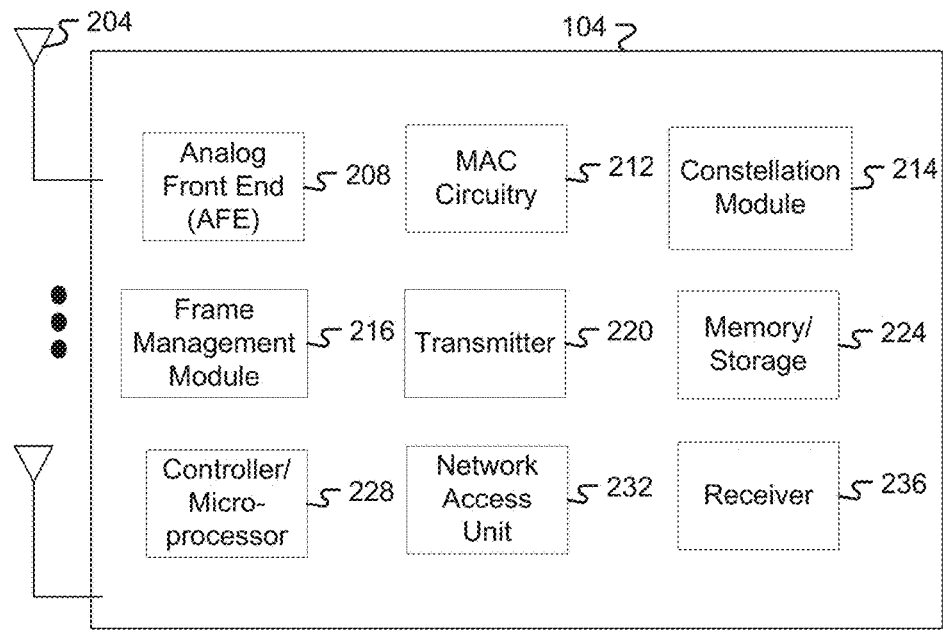
FIG. 2 illustrates an exemplary wireless device.

An example of a wireless device 104 architecture is shown in FIG. 2. The wireless device 104 may comprise hardware circuitry and/or software that conduct various operations illustrated herein. The wireless device 104 also includes conventional and well known components which have been omitted for clarity. The operations can include, but are not limited to, conducting calls, opening multiple applications, presenting information through audio and/or video means, taking pictures, receiving frames, etc. The wireless device 104 can be any type of computing system operable to conduct the operations described here. As an example, the wireless device 104 can be a mobile phone which includes and interacts with various modules and components 208-236 as shown in FIG. 2.

The wireless device 104 can have one or more antennas 204, for use in wireless communications such as multi-input multi-output (MIMO) communications, Bluetooth®, etc. The antennas 204 can include, but are not limited to directional antennas, omnidirectional antennas, monopoles, patch antennas, loop antennas, microstrip antennas, dipoles, and any other suitable for communication transmission. In an exemplary embodiment, transmission using MIMO may require particular antenna spacing. In another exemplary embodiment, MIMO transmission can enable spatial diversity allowing for different channel characteristics at each of the antennas. In yet another embodiment, MIMO transmission can be used to distribute resources to multiple users.

Antennas 204 generally interact with an Analog Front End (AFE) module 208, which is needed to enable the correct processing of the received modulated signal. The AFE 208 can be located between the antenna and a digital baseband system in order to convert the analog signal into a digital signal for processing.

The wireless device 104 can also include a controller/microprocessor 228 and a memory/storage 224. The wireless device 104 can interact with the memory/storage 224 which may store information and operations necessary for configuring and transmitting or receiving the message frames described herein. The memory/storage 224 may also be used in connection with the execution of application programming or instructions by the controller/microprocessor 228, and for temporary or long term storage of program instructions and/or data. As examples, the memory/storage 224 may comprise a computer-readable device, RAM, ROM, DRAM, SDRAM or other storage devices and media.

The controller/microprocessor 228 may comprise a general purpose programmable processor or controller for executing application programming or instructions related to the wireless device 104. Further, controller/microprocessor 228 can perform operations for configuring and transmitting message frames as described herein. The controller/microprocessor 228 may include multiple processor cores, and/or implement multiple virtual processors. Optionally, the controller/microprocessor 228 may include multiple physical processors. By way of example, the controller/microprocessor 228 may comprise a specially configured Application Specific Integrated Circuit (ASIC) or other integrated circuit, a digital signal processor, a controller, a hardwired electronic or logic circuit, a programmable logic device or gate array, a special purpose computer, or the like.

The wireless device 104 can further include a transmitter 220 and receiver 236 which can transmit and receive signals, respectively, to and from other wireless devices 104 and/or communication devices 108 using one or more antennas 204. Included in the wireless device 104 circuitry is the medium access control or MAC Circuitry 212. MAC circuitry 212 controls access to the wireless medium. In an exemplary embodiment, the MAC circuitry 212 may be arranged to contend for a wireless medium and configure frames or packets for communicating over the wireless medium. The MAC circuitry 212 can work together or independently of the frame management module 216, which can aid in generating frames. The frame management module 216 can but is not limited to, identifying the fields within the frame, determining the standard used, adding the bits identifying the coding, modulation scheme(s), data rates and lengths used in the appropriate frame fields. Adding data rate and length, can provide the information needed to determine the standard used and identify the payload information including corresponding service bits, data bits, tail bits, etc.

The wireless device 104 can also contain a constellation module 214. The constellation module 214 maps the sequence of bits in each spatial stream to constellation points (i.e., constellation numbers). The constellation module 214 can work in conjunction with the frame management module 216 to identify the correct bits to be used in the preamble of the frame which can be used to identify the standard used. Another module that the wireless device 104 can include is the network access unit 232. The network access unit 232 can be used for connectivity with the communication device 108. In one exemplary embodiment, the connectivity can include synchronization between devices. In another exemplary embodiment, the network access unit 232 provides support to the frame management module 216 for frame detection using a communication network. In yet another embodiment, the network access unit 232 can work in conjunction with at least the MAC circuitry 212. The network access unit 232 can also work and interact with one or more of the other modules described herein.

The modules described and others known in the art can be used with the wireless device 104 and can be configured to perform the operations described.

Figure 3:
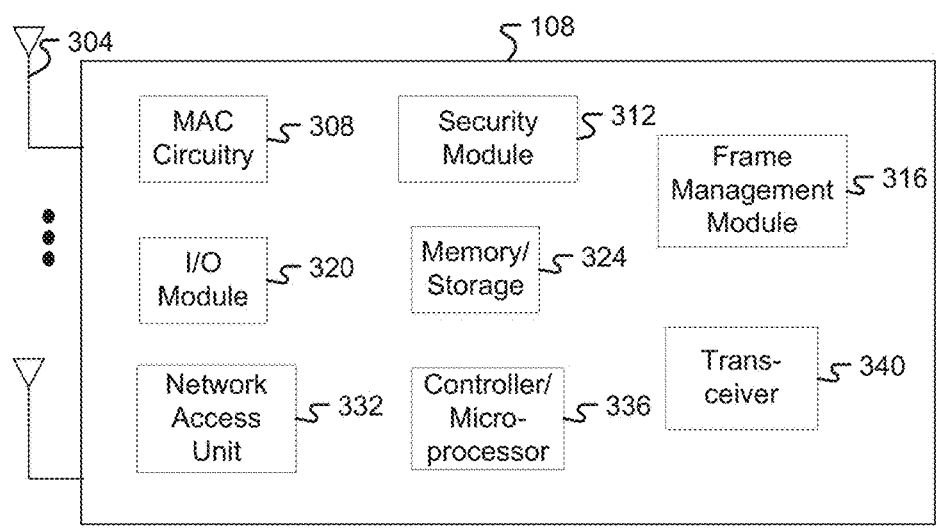
FIG. 3 illustrates an exemplary communication device.

An example of a communication device 108 architecture is shown in FIG. 3. The communication device 108 may comprise hardware and/or software that conduct various operations illustrated herein. The communication device 108 also includes conventional and well known components which have been omitted for clarity. The operations can include, but are not limited to, broadcasting location information, providing a medium for communication between a wireless device 104 and a WLAN, synchronizing with wireless devices 104, providing hotspot identification, internet connectivity, etc. The communication device 108 can be any type of computing system operable to conduct the operations described here. As an example, the communication device 108 can be an access point (AP) which includes and interacts with various modules and components 308-340 as shown in FIG. 3.

The communication device 108 can have one or more antennas 304, for use in wireless communications such as multi-input single-output (MISO), single-input multi-output (SIMO), MIMO or the like. The antennas 304 can include, but are not limited to directional antennas, omnidirectional antennas, monopoles, patch antennas, loop antennas, microstrip antennas, dipoles, and any other suitable for communication transmission. In an exemplary embodiment, transmission using MIMO may require particular antenna spacing. In another exemplary embodiment, MIMO transmission can enable spatial diversity allowing for different channel characteristics at each of the antennas. In yet another embodiment, MIMO transmission can be used to distribute resources to multiple users.

The communication device 108 can also include most if not all of the same or similar modules as the wireless device 104. For example, for connectivity between devices, the MAC circuitry module 308, network access unit 332 and at least the transceiver 340 are all modules that exist and perform functions such as those described above and in conjunction with FIG. 2. In addition, these modules provide other functions that are known in the art and required for communication with the wireless device 104.

The memory/storage 324 and controller/micro-processor 336 store and process information necessary for at least sensing, scanning, transmitting, receiving, configuring, etc., frames to be communicated among devices as well as, all other necessary operations as described herein. As examples, the memory/storage 324 may comprise a computer-readable device, RAM, ROM, DRAM, SDRAM or other storage devices and media. The controller/microprocessor 336 may include multiple processor cores, and/or implement multiple virtual processors and may comprise a specially configured Application Specific Integrated Circuit (ASIC) or other integrated circuit, a digital signal processor, a controller, a hardwired electronic or logic circuit, a programmable logic device or gate array, a special purpose computer, or the like.

An input/output (I/O) module 320 can also be part of the communication device 108 architecture. The input/output module 320 and associated ports may be included to support communications over wired or wireless networks or links. For example, I/O module 320 can provide communication with wireless devices 104, servers, communication devices, and/or peripheral devices. Examples of an I/O module 320 include an Ethernet port, a Universal Serial Bus (USB) port, Institute of Electrical and Electronics Engineers (IEEE) port 1394, or other interface.

A frame management module 316 can also be part of the communication device 108 architecture. The frame management module 316 can include, but is not limited to, identifying the fields within the frame, determining the standard used, identifying the coding, modulation scheme(s), data rates and lengths used in the appropriate frame fields Adding data rate and length, will provide the information needed to determine the standard used and identify the payload information including corresponding service bits, data bits, tail bits, etc.

Communication device 108 can also contain a security module 312. The security module 312 will contain information regarding, but not limited to, security parameters required to connect the wireless device 104 to the communication device 108 or other available networks, and can also include WEP or WPA security access keys, network keys, etc.

The modules described and others known in the art can be used with the communication device 108 and can be configured to perform the operations described.

When legacy devices such as those compliant with an earlier version of a standard reside in the same WLAN as devices compliant with later versions of the standard, mechanisms or processes may need to be employed for the legacy devices to know when newer versions are in use so as to avoid possible interference. Providing a mechanism that enables this is important due to the coexistence between the legacy products and those newer products.

Backward compatibility with legacy devices is possible at the physical (PHY) layer. At the PHY layer, backward compatibility may be achieved by re-using the preamble from a previous standard. The preamble may be decoded by all devices, which would provide sufficient information for the device to determine that the wireless channel is being used and avoid interference despite not being able to understand the rest of the information contained within the frame.

Figure 4:
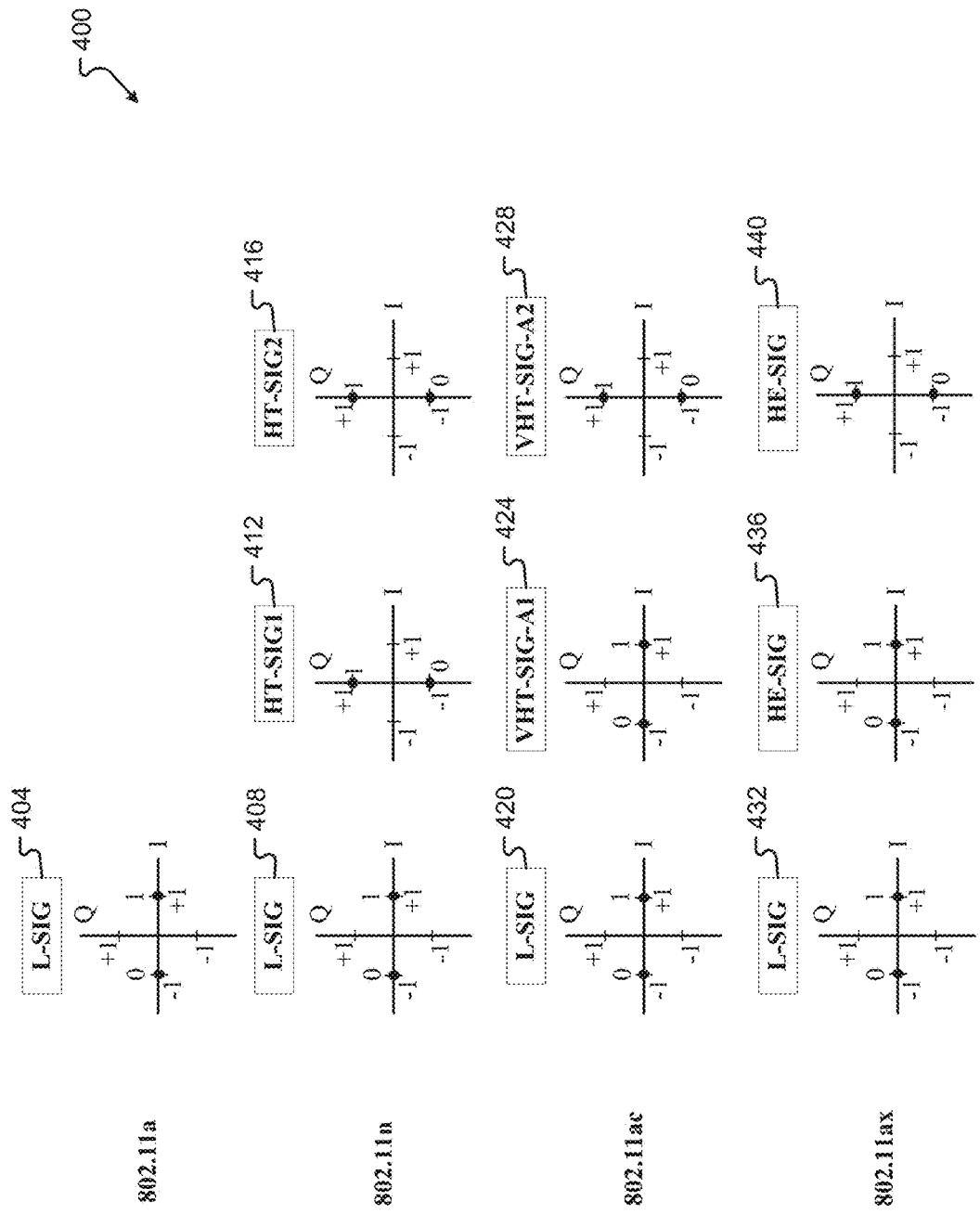
FIG. 4 illustrates exemplary constellations for IEEE 802.11 packet classification.

FIG. 4 illustrates exemplary constellations 400 for IEEE 802.11 packet classification. As IEEE 802.11 frames are transmitted, it is important for communication devices 108 and/or stations (STA) to be able to identify what standard is used in the transmission. To facilitate this distinction, the newer versions of the IEEE 802.11 frames are being transmitted to include legacy compatible portions (i.e., preambles). This compatible portion/preamble includes information for example, relating to a length of time for which a legacy communication device 108 or High Throughput (HT) communication device will defer transmission so as to avoid collision. The preamble generally includes a Legacy Short Training Field (L-STF), Legacy Long Training Field (L-LTF), and Legacy Signal Field (L-SIG). These fields are discussed in more detail below and in conjunction with FIGS. 5-9.

Beyond the preamble, the frames (excluding legacy) also contain corresponding SIG, STF and LTF fields which provide specific details regarding the standard, modulation and coding scheme used. As an example, a frame using IEEE 802.11n for High Throughput (HT) transmission, will contain HT-SIG, HT-STF, and HT-LTF fields. As another example, a frame using IEEE 802.11ac for Very High Throughput (VHT) transmission, will contain VHT-SIG, VHT-STF and VHT-LTF fields. Still as another example, an IEEE 802.11 ax frame with High Efficiency (HE) WLAN transmission, can contain HE-SIG, HE-STF and HE-LTF fields. Accordingly, the SIG fields contain the bits differentiating between the standards. One or more bits can be used and can be distributed among multiple SIG fields (i.e. 412, 416 and/or 424, 428, and/or 436, 440).

In FIG. 4, as part of the compatible portion/preamble L-SIG fields 404, 408, 420, 432 are common in all frames and contains among other things information about the data rate and length used. The bits are arranged on the standard constellation using In-phase (I) (0,1) and Quadrature (Q) (+1, −1) representation. The L-SIG fields 404, 408, 420, 432, are all the same regardless which standard is used (i.e., legacy IEEE 802.11a, HT IEEE 802.11n, VHT IEE 802.11ac, HE IEEE 802.11ax).

After the preamble, the corresponding SIG, LTF and STF fields exist as described above. The SIG fields provide the bits differentiating between the various WLAN standards. As illustrated in FIG. 4 for example, a communication device 108 will know a WLAN 802.11n frame was transmitted by reading the HT-SIG1 412 and HT-SIG2 416 fields, present in a WLAN 802.11n frame. The HT-SIG1 412 and HT-SIG2 416 fields include bits which are described via two constellations with a 90° rotation.

Similarly, in Very High Throughput frames (i.e., WLAN IEEE 802.11ac frames), the VHT-SIG-A1 424 and VHT-SIG-A2 428 field constellations appear in the same place as the HT-SIG1 412 and HT-SIG2 416 field constellations of the WLAN 802.11n frame. However, as evident from the constellations 400, a constellation rotation is applied to the HT-SIG1 412 field constellation and not to the VHT-SIG-A1 424 field constellation of the WLAN 802.11ac frame. The transmitted WLAN 802.11 ac frame can therefore be received at an HT communication device 108 and because the constellation rotation that would appear on the HT-SIG1 412 is not present, the HT communication device 108 defers transmission. Thus, the WLAN 802.11ac frame can be detected as not being a WLAN 802.11n frame by virtue of the constellation rotation not being present on a VHT-SIG-A1 424 field constellation of the received frame. Similarly, the legacy communication device 108 would defer transmission because the legacy communication device 108 would not recognize the VHT-SIG-A1 424 field constellation that follows the preamble.

In WLAN 802.1 lax frames, the HE-SIG1 436 and HE-SIG2 440 field constellations appear in the same place as the HT-SIG 412 and HT-SIG 416 field constellations on the WLAN 802.11n frame. However, like with the VHT frames, a constellation rotation is applied to the HT-SIG1 412 field constellation that is not present on the HE-SIG1 436 field constellation on the WLAN 802.11ax frame. The transmitted WLAN 802.11ax frame can be received at an HT communication device 108, however because the constellation rotation is not present, the HT communication device will defer transmission. The legacy communication device 108 would defer transmission because the legacy communication device 108 does not recognize the HE-SIG1 436 field that follows the preamble. However, since both the WLAN IEEE 802.11ac and WLAN 802.11ax frame constellations contain the same rotation (i.e., BPSK modulations), the VHT devices, for example, can correctly defer transmission based on the LENGTH field in the L-SIG field found in the preamble. The LENGTH field for a VHT IEEE 802.11 ac frame, is divisible by 3. Thus, if the LENGTH field is not divisible by 3 (as specified in the standard), the VHT communication device 108 would defer transmission as the VHT communication device 108 is an HE communication device 108 instead. The LENGTH field can similarly be used by other legacy devices for frame detection. Specific details regarding the divisible by 3 LENGTH field constraint as well as other field details are in line with the IEEE 802.11 standards.

FIGS. 5, 6, and 7 illustrate conventional IEEE 802.11a/n/ac frame formats for communication over Wireless Local Area Network (WLAN). FIG. 5 illustrates an exemplary legacy frame used with IEEE 802.11a. The WLAN 802.11a frame 500 contains a preamble 514 portion and a payload 516 portion. The preamble 514 contains various fields including, but not limited to, a Legacy Short Training Field (L-STF) 504, a Legacy Long Training Field (L-LTF) 508, and a Legacy Signal Field (L-SIG) 512. The L-STF 504 and L-LTF 508 fields are preamble fields generally 2 symbols in length that are transmitted for backwards compatibility and synchronization. The L-SIG 512 field is considered part of the header which is used to communicate rate and length information. In addition, the preamble provides information that is relevant to the transmission of the data and details as to the type of packet it is, whether it be 802.11a, 802.11n, 802.11 ac, or an 802.11 ax. After the preamble 514, the frame includes a payload 516. The payload 516 is the part of the frame that includes the data portion. The payload 516 can include a service field, a scramble physical layer service data unit field (PSDU), tail bits, padding bits and other such information.

FIG. 6 illustrates an exemplary packet format for an IEEE 802.11n frame. In general, WLAN 802.11n compliant devices have support for three frames modes: legacy, Mixed Format (MF) and green field modes. The difference frame modes allow a WLAN 802.11n compliant device to communicate with legacy devices as well as other WLAN 802.11n compliant devices. As an example, FIG. 6 depicts a WLAN 802.11n High Throughput (HT) MF frame. In a mixed format or mixed mode, the frames contain the legacy preamble 614, an HT portion 626 and the payload 628, so that the frame may be decoded by both IEEE 802.11a and IEEE802.11n compliant devices.

That is, the WLAN 802.11n frames 600 are compatible with both the legacy devices and with the newer 802.11 technology. The preamble 614, as depicted in FIG. 6, shares the same fields as the legacy WLAN 802.11a frame 500. Therefore, the L-STF 604, L-LTF 608, and header L-SIG 612 fields exist in both the WLAN 802.11a frame 500 and the WLAN 802.11n frame 600 and serve similar functions. To differentiate from the legacy WLAN 802.11a frame 500, the WLAN 802.11n frame 600 also contains an HT portion 626. The HT portion 626 can include, but is not limited to, an HT-SIG field 616, an HT-STF field 620, and an HT-LTF field 624. The HT-SIG field 616, HT-STF field 620, and HT-LTF field 624 in the HT portion 626 have a similar function as the equivalent fields in the preamble 614. For example, HT-SIG field 616 and HT-STF field 620 aid in synchronization and the HT-SIG field carrying length and rate information. In addition, the HT portion 626 enables estimation of the MIMO channel to support demodulation of the data portion in the payload 628 by the HT communication devices 108, as well as determination of which standard is used as explained in detail above and in conjunction with the constellations in FIG. 4. The payload 628 will contain the data, service field bits, tail bits, etc.

FIG. 7 is a very high throughput packet format used for IEEE802.11ac communications. Specifically, FIG. 7 illustrates an exemplary packet format for a WLAN 802.11ac frame 700 with Very High Throughput (VHT) MF capability. A communication device 108 configured to receive an WLAN 802.11ac frame 700, which is arranged to be compatible with HT MF communication devices 108 and legacy communication devices 108 has the following frame format. Like the WLAN 802.11n frame 600, the WLAN 802.11ac frame 700 will contain a preamble 714, a VHT portion 726 and a payload 728. The preamble 714 will contain the relevant L-STF 704, L-LTF 708, and L-SIG 712 fields. The VHT portion 726 will contain at least the VHT-SIG-A 716, VHT-STF 720, and the VHT-LTF 724 fields. The WLAN 802.11ac 700 frame will be detected over a WLAN 802.11n frame 600 by virtue of the constellation rotation absent in the VHT-SIG-A 716 field as described with FIG. 4. Further, a transmitted WLAN 802.11ac frame 700 can be received at a VHT communication device 108. The legacy communication device 108 defers transmission due the presence of the VHT portion 726 and the HT communication device 108 defers transmission due to absence of a rotation in the VHT-SIG-A 716 field. The frame ends with a payload 728 which includes data, service field bits, tail bits and other general information.

Figure 8:
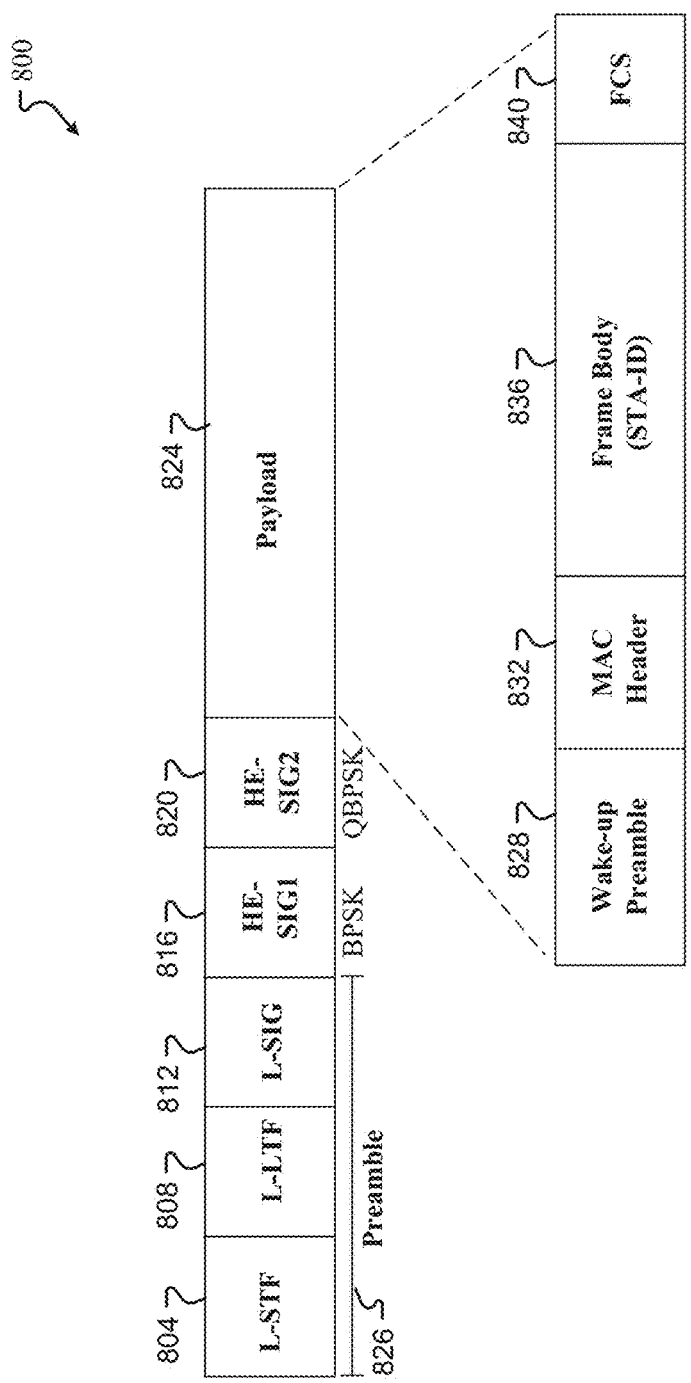
FIG. 8 illustrates an exemplary High Efficiency (HE) Packet Format with OOK modulation classification.

FIG. 8 illustrates an exemplary packet format for an IEEE 802.11ax High Efficiency frame with OOK modulation classification. As illustrated in FIG. 8, the compatible portion (i.e., preamble 826) continues to exist in the WLAN 802.11ax frame 800 as is the case with newer WLAN 802.11 versions of the frames. Fields L-STF 804, L-LTF 808, and L-SIG 812 remain constant and contain information as detailed above and in conjunction with FIGS. 5-7.

New aspects introduced in IEEE 802.11 ax include the use of On-Off Keying (OOK) modulation scheme and eight times repetition coding (Rep8). These new modulation and coding schemes, were introduced to resolve the link-budget imbalance problem encountered by legacy communication devices. However, the current WLAN 802.11 ax frame 800 does not provide an indication that either OOK or Rep8 is used, so that the legacy IEEE 802.11a/n/ac/ax communication devices 108 can correctly defer transmission. Therefore, the IEEE 802.11 ax frame illustrated in FIG. 8, for example, introduces the used of HE-SIG fields to make such distinction. The HE-SIG1 field 816 and HE-SIG2 field 820 can be one or more fields and can be located to the right of the L-SIG field or in any other part of the frame including before or after any field, within the preamble 826 and/or payload. As one example, if the HE-SIG1, HE-SIG2 fields 816, 820 are located after the L-SIG field 812. Since IEEE 802.11a/n/ac compatible communication devices 108 lack the HE-SIG1 and HE-SIG2 fields, a communication device compatible with IEEE 802.11a/n/ac looking to connect, would not recognize the packet and would properly defer transmission.

OOK modulation is a simple modulation scheme that provides better spectral efficiency over other modulation schemes such as Frequency-Shift Keying (FSK). WLAN 802.11 ax frame 800 presents a general frame where the use of OOK modulation can be identified using the HE-SIG1 816 and HE-SIG2 820 fields. To identify the use of OOK modulation, a bit (i.e., Robust Packet (RP) bit—not shown) can be allocated within the either the HE-SIG 816, the HE-SIG2 820 field or both as indication of the use of OOK. In this manner, the HE communication device 108 when receiving the frame can immediately determine whether OOK is used.

Following the HE-SIG1, HE-SIG2 fields 816, 820 is the payload data 824. The payload data 824 amongst other things can include, but is not limited to, service bits, tail bits, a wake-up preamble 828, MAC header 832, Frame body 836, and FCS 840. The MAC header 832 can include information indicating whether the frame includes a Narrow-Band Resource Allocation (NR-RA) and Frame Body 836 can include details regarding the Station Identification (STA ID).

Figure 9:
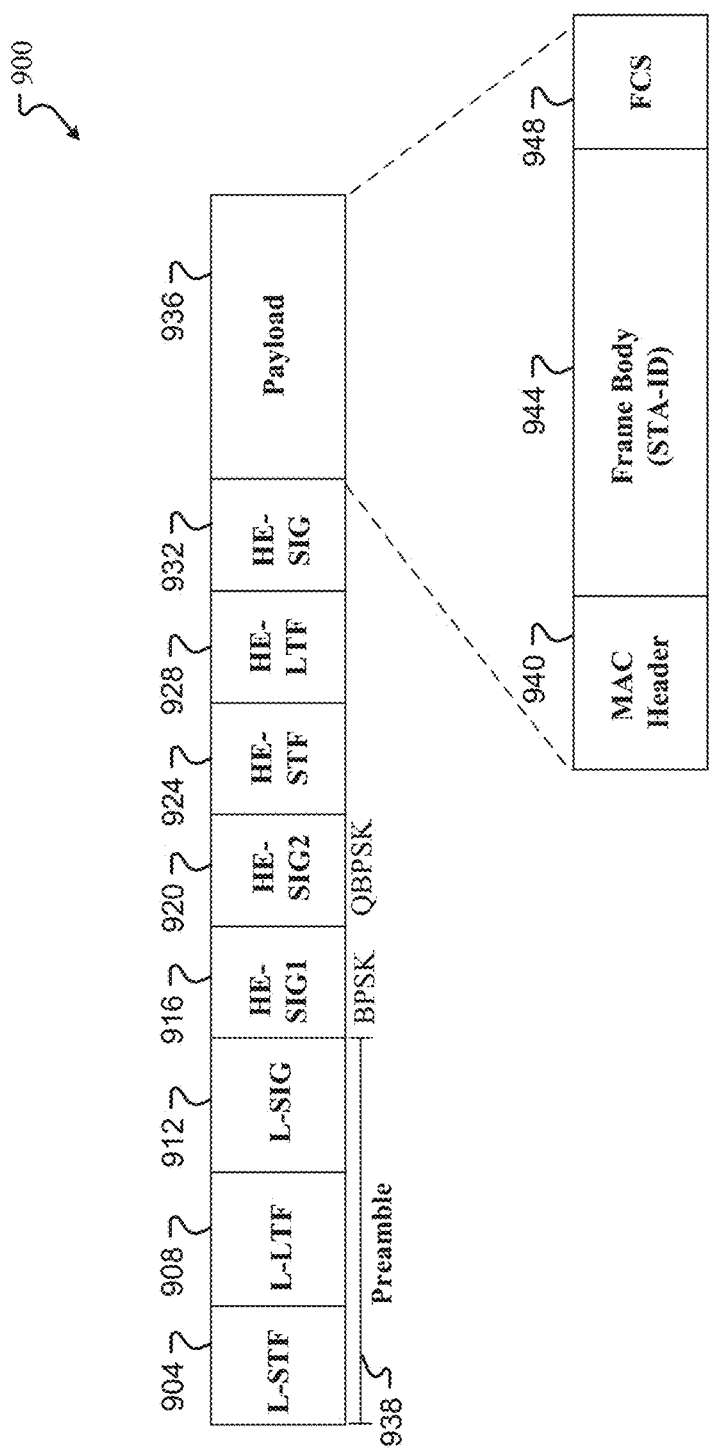
FIG. 9 illustrates an exemplary High Efficiency (HE) Packet Format with Rep8 coding classification.

FIG. 9 illustrates an exemplary packet format for a WLAN 802.11ax frame 900 for High Efficiency WLAN transmission with Rep8 modulation classification. In some instances, as illustrated in FIG. 9, the WLAN 802.11 ax frame 900 can contain fields HE-STF 924, HE-LTF 928, and HE-SIG 932 within an HE portion 934, like those described above and in conjunction with FIGS. 4 and 6-7. In addition, the frame can also include the preamble 938 with corresponding L-STF 904, L-LTF 908 and L-SIG 912 fields. In instances where Rep8 coding is used, the frame will include HE-SIG1 916 and HE-SIG2 920 fields. The HE-SIG1 916 and HE-SIG2 920 fields can appear after or within the preamble 938, within or before the payload 936 and/or before/after the HE fields HE-STF 924, HE-LTF 928 and HE-SIG 932. A RP bit (not shown) can be allocated in one or both of the HE-SIG 916, 920 fields to indicate the use of Rep8 coding. The payload field 936 is a variable field where data such as Frame body 944 including STA ID, MAC Header 940 with indication as to whether it is an NR-RA frame, and an FCS 948 field are included.

Figure 10:
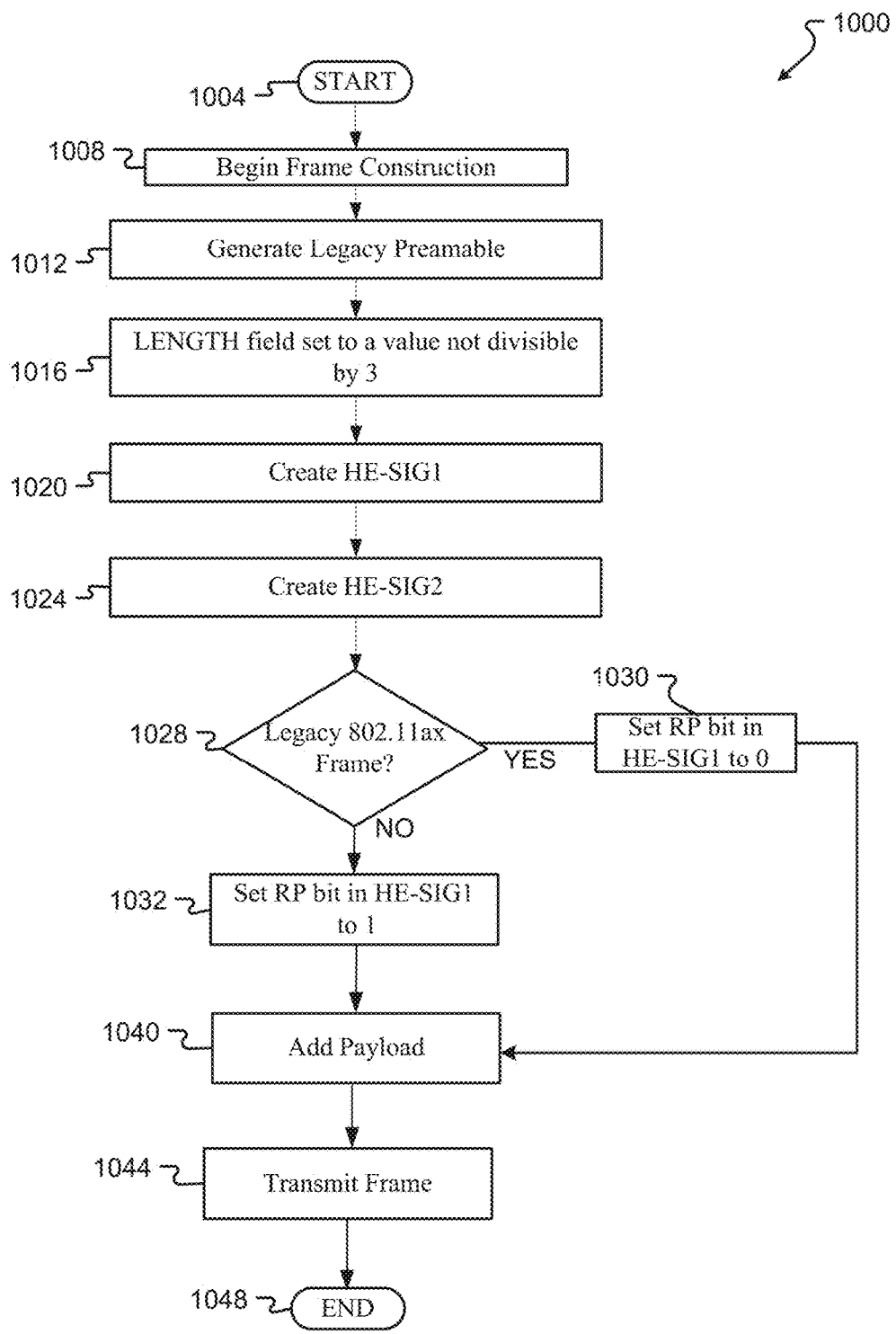
FIG. 10 is a flowchart illustrating the formation of an IEEE 802.11 ax frame packet with OOK modulation.

FIG. 10 is a flowchart illustrating exemplary frame generation of a WLAN 802.11ax HE frame with OOK modulation. In particular, the association begins at step 1004 and continues to 1008. In step 1008, frame construction begins. At this stage, the various fields of a frame will be adequately generated to create an equivalent IEEE 802.11 frame with coding and modulation classification. As an example, a WLAN 802.11 ax compliant frame is constructed. At step 1012, frame construction begins with the preamble. As described above, and in conjunction with FIGS. 5-8, IEEE 802.11 frames contain a standard legacy preamble containing various fields including L-SIG, S-STF, and L-LTF fields. These fields contain information about the length, the data rate, and other information that provide the system receiving it with details about the type of frame transmitted. After the legacy preamble is created, the process then continues to step 1016.

In step 1016, the LENGTH field located within the L-SIG field is set to a value not divisible by 3. As described above, and in accordance with the IEEE standards, a LENGTH field whose value is not divisible by 3 is a differentiating factor between for example, a WLAN 802.11ax and a WLAN 802.11ac frame. The process continues to steps 1020 and 1024.

Steps 1020 and 1024 correspond to the addition of HE-SIG1 and HE-SIG2 fields which provide coding and/or modulation classification information carried within a Robust Packet bit in one or both of the HE-SIG1 and HE-SIG2 fields. The indication by the Robust Packet bit provides the details required to determine whether IEEE 802.11 ax legacy modulation is used or OOK modulation is used. If indication, in step 1028, by the Robust Packet bit is that indeed WLAN 802.11 ax frame is transmitted with legacy modulation, then the process continues to step 1030, where the corresponding the HE-SIG1 field for example, is updated with a RP bit equal to 0. Alternatively, the HE-SIG2 field can be updated with the RP bit equal to 0. In addition, the RB bit can be set to 1 and/or both HE-SIG1 and HE-SIG2 fields can include a RB bit.

Alternatively, if the frame is WLAN 802.11 ax frame with OOK modulation, then the process moves to step 1032. At step 1032, the Robust packet bit in the HE-SIG1 field is updated to a 1. Note that the RP bit can alternatively be set to 0, and/or both HE-SIG1 and HE-Sig 2 fields can include a RP bit with modulation information. A frame with OOK modulation is very similar to a frame that uses legacy modulation, except for the specific payload information which is varied accordingly for OOK.

Once the HE-SIG1 field has been updated with the appropriate RP bit, the process continues to step 1040 where the payload is added to the frame. The payload can include amongst other things, data, service bits, tail bits, error detection bits, etc. After the addition of the payload, the frame has been completely constructed and the frame is ready for transmission. In step 1044 the frame is transmitted and the process ends at step 1048.

Figure 11:
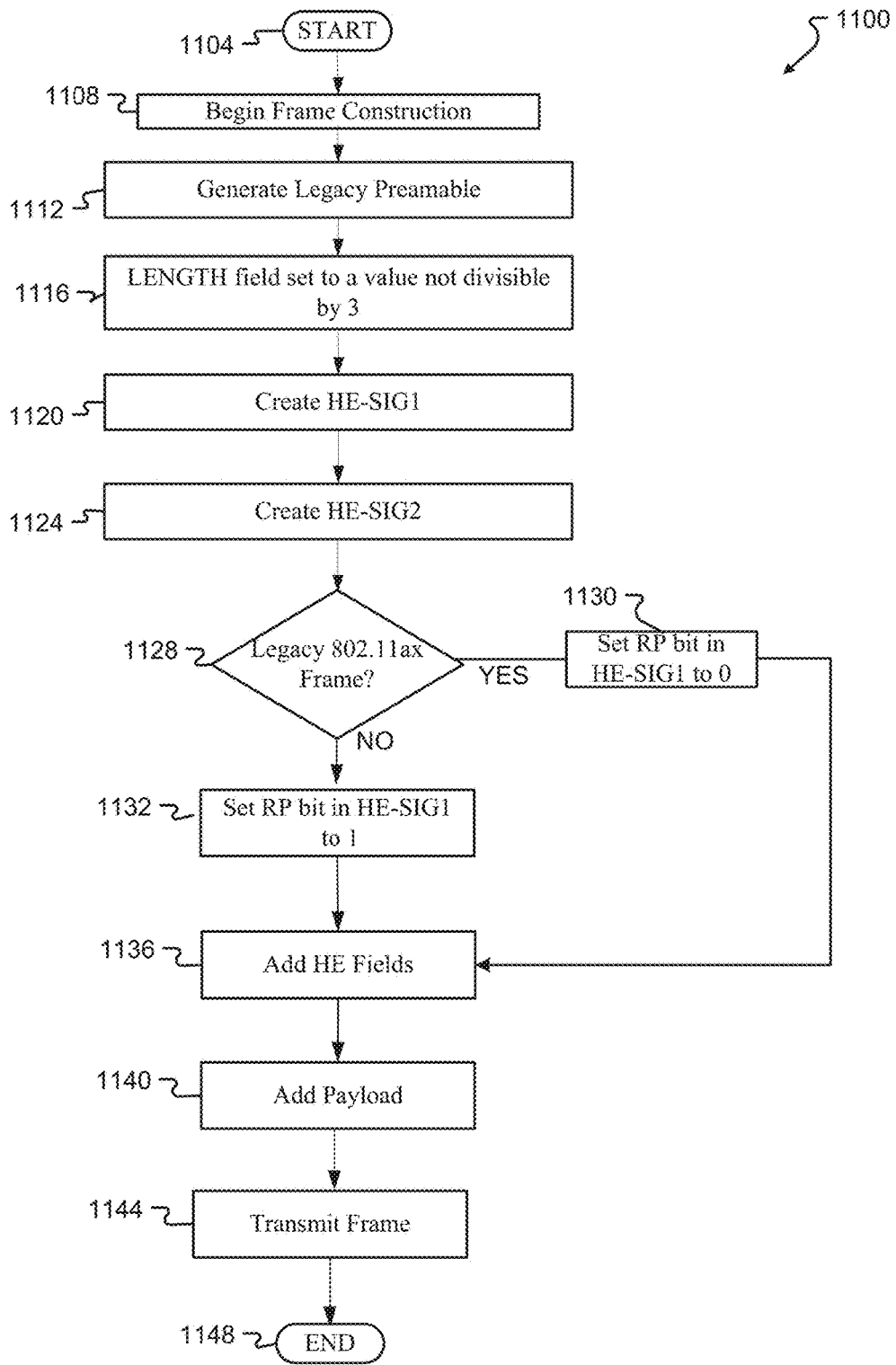
FIG. 11 is a flowchart illustrating the formation of an IEEE 802.11 ax frame packet with Rep8 coding.

FIG. 11 is a flowchart illustrating exemplary frame generation of a WLAN 802.11 ax HE frame with Rep8 coding. In particular, the association begins at step 1104 and continues to 1108. In step 1108, frame construction begins. At this stage, the various fields of a frame will be adequately generated to create an equivalent IEEE 802.11 frame with coding and/or modulation classification. As an example, a WLAN 802.11 ax compliant frame is constructed. At step 1112, frame construction begins with the preamble. As described above, and in conjunction with FIGS. 5-8, IEEE 802.11 frames contain a standard legacy preamble containing various fields including L-SIG, S-STF, and L-LTF fields. These fields contain information about the length, the data rate, and other information that provide the system receiving it with details about the type of frame transmitted. After the legacy preamble is created, the process then continues to step 1116.

In step 1116, the LENGTH field located within the L-SIG field is set to a value not divisible by 3. As described above, and in accordance with the IEEE standards, a LENGTH field whose value is not divisible by 3 is a differentiating factor between for example, a WLAN 802.11ax and a WLAN 802.11ac frame. The process continues to steps 1120 and 1124.

Steps 1120 and 1124 correspond to the addition of HE-SIG1 and HE-SIG2 fields which provide coding and/or modulation classification information carried within a Robust Packet bit in one or both of the HE-SIG1 and HE-SIG2 fields. The indication by the Robust Packet bit provides the details required to determine whether IEEE 802.11 ax legacy coding is used or OOK coding is used. If indication, in step 1128, by the Robust Packet bit is that indeed WLAN 802.11ax frame is transmitted with legacy coding, then the process continues to step 1130, where the corresponding the HE-SIG1 field for example, is updated with a RP bit equal to 0. Alternatively, the HE-SIG2 field can be updated with the RP bit equal to 0. In addition, the RB bit can be set to 1 and/or both HE-SIG1 and HE-SIG2 fields can include a RB bit.

Alternatively, if the frame is WLAN 802.11 ax frame with Rep8 coding, then the process moves to step 1132. At step 1132, the Robust packet bit in the HE-SIG1 field is updated to a 1. Note that the RP bit can alternatively be set to 0, and/or both HE-SIG1 and HE-SIG2 fields can include a RP bit with modulation information. A frame with Rep8 coding is very similar to a frame that uses legacy coding, except for the specific payload information which is varied accordingly for Rep8.

A WLAN 802.1 lax frame with Rep8 coding as described above and in conjunction with FIG. 9 contains an HE portion much like a WLAN 802.11ac frame with a VHT portion and a WLAN 802.11n with an HT portion. In the corresponding HE portion, of step 1136 in the process, fields such as HE-STF, HE-LTF and HE-SIG are added to the frame. Once the HE portion is complete, the process continues to step 1140 where the payload is added to the frame. The payload can include amongst other things, data, service bits, tail bits, error detection bits, etc. After the addition of the payload, the frame has been completely constructed and the frame is ready for transmission. In step 1144 the frame is transmitted and the process ends at step 1148. Alternatively, the HE-SIG1 and HE-SIG 2 fields could both contain RP bits indicating the use of one or both Rep8 coding and OOK modulation, or the use of legacy modulation and coding.

Figure 12:
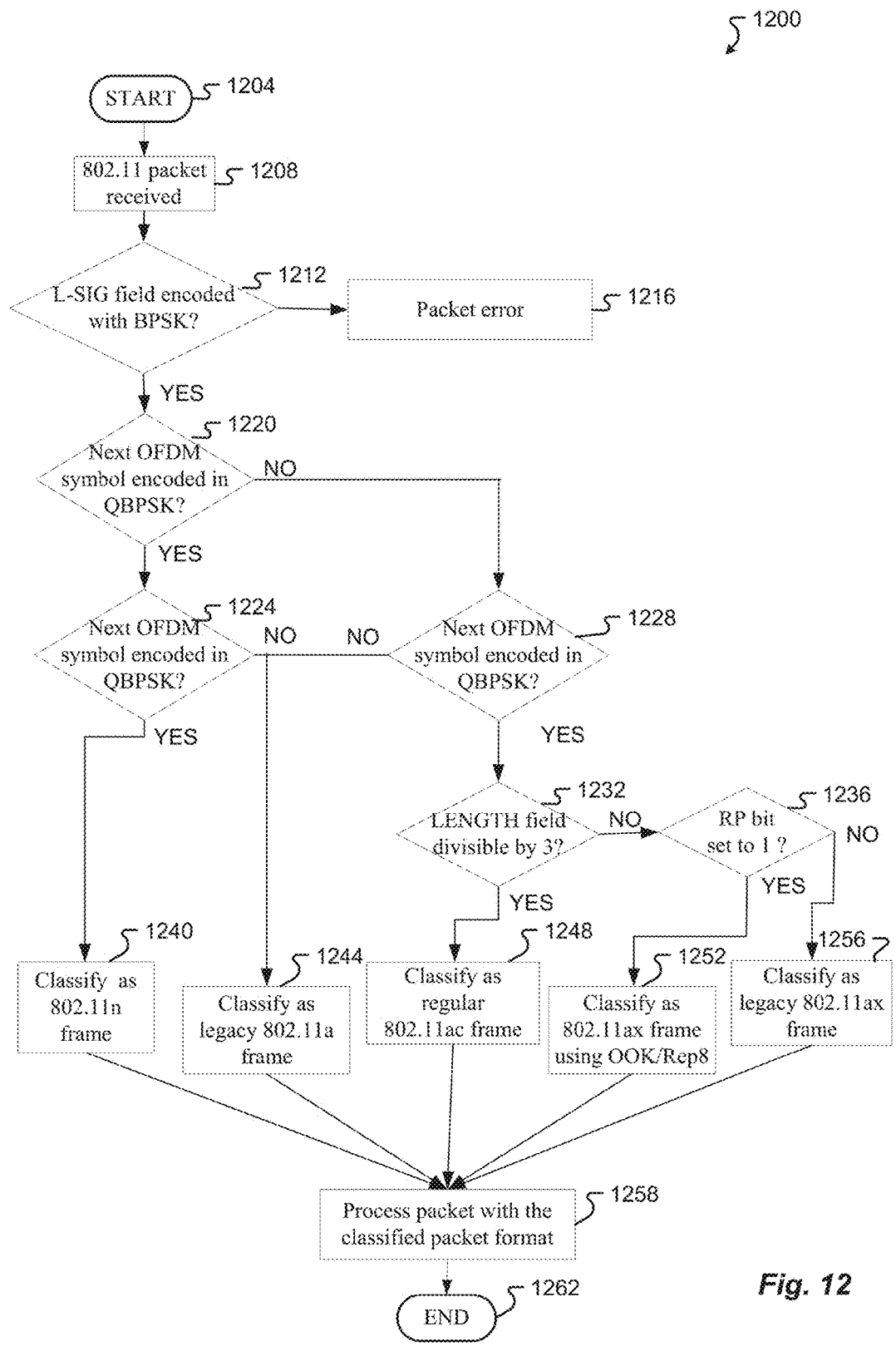
FIG. 12 is a flowchart illustrating the IEEE 802.11 packet detection.

FIG. 12 is a flow chart illustrating detection of a WLAN 802.11ax frame. In particular, the association begins at step 1204 and continues to step 1208. In step 1208, a communication device receives an IEEE 802.11 PHY frame. Upon receipt of the frame, the communication device will determine the type of frame received for data processing.

For frame determination, the process continues to step 1212, where the frame data is retrieved and the L-SIG field located within the legacy preamble of the packet received is checked. The L-SIG field for a WLAN frame will be encoded with BPSK, therefore, if the determination is true, processing continues to step 1220. Alternatively, if it is determined that the L-SIG field within the legacy preamble is not encoded with BPSK, then the process ends with a packet error in step 1216.

As described above, and in conjunction with FIGS. 4 and 6, a WLAN 802.11n frame is differentiated from a WLAN 802.11 ac or WLAN 802.11 ax frame, by the use of a QBPSK constellation in the HT-SIG1 and HT-SIG2 fields. Accordingly, in the process steps 1220 and 1224, if fields (i.e. OFDM symbols encoded with QBPSK) following the L-SIG field in the preamble are OFDM symbols encoded in QBPK, then a WLAN 802.11n frame has been received, and the frame is classified as a WLAN 802.11n packet in step 1240.

In a similar fashion, the next two OFDM symbols are checked in each WLAN 802.11 frame received in steps 1220 and 1224. If after the L-SIG field is checked, an OFDM symbol is encoded in QBPSK in step 1220, but not in step 1224, then the packet received can be classified as a legacy WLAN 802.11a frame in step 1244. However, if the first OFDM symbol checked in step 1220 is not encoded in QBPSK and encoded in QBPSK in step 1228, then a situation like that described above and in conjunction with constellations in FIG. 4 and FIGS. 6-9 arises, where the frame received can be either a WLAN 802.11 ac or WLAN 802.11 ax frame. The process therefore, then continues to step 1232 where the LENGTH field within the L-SIG field is checked. If the value within the LENGTH field is divisible by 3, then the frame can be classified as a WLAN 802.11ac frame in step 1248.

Alternatively, if the LENGTH field is not divisible by 3, then a Robust Packet bit within the HE-SIG1 and/or HE-SIG2 field is checked in step 1236. As described above, a robust packet bit can be introduced within the WLAN 802.11ax frame to identify the use of a new coding/modulation scheme. Therefore, if the RP bit is set to 1, then the packet can be classified as a WLAN 802.11ax frame with either OOK modulation or Rep8 coding in step 1252. If instead, the RP bit is not set to 1 or set to 0, then the packet received is classified as a legacy WLAN 802.1 lax frame in step 1256.

Once the WLAN 802.11 frame has been correctly classified (i.e., in steps 1240, 1244, 1248, 1252, and 1256), the process continues to step 1258 where the information is processed, and the process ends at step 1262.

Embodiments are thus directed toward a device, comprising: a memory; a transceiver, the transceiver configured to: receive a plurality of physical layer frames; a processor, the processor cooperating with the memory and configured to: retrieve information from at least one of the physical layer frames; read a robust packet bit; and process the data in the at least one of the physical layer frames. Aspects of the above device include wherein the information retrieved from the physical layer frame includes at least a preamble and payload, wherein preamble includes an L-SIG field. Aspects of the above device include wherein the information retrieved further includes at least one of an HE-SIG1 and HE-SIG2 fields. Aspects of the above device include wherein the robust packet bit read resides in at least one of the HE-SIG1 and the HE-SIG 2 fields. Aspects of the above device include wherein the robust packet bit indicates the use of On-Off Keying (OOK) modulation. Aspects of the above device include wherein the robust packet bit indicates the use of eight times repetition coding (Rep8). Aspects of the above device include wherein the robust packet bit indicates the use of legacy coding and modulation. Aspects of the above device include wherein a LENGTH field within the L-SIG field indicates the use of High Efficiency (HE) Wireless Local Area Network (WLAN) transmission. Aspects of the above device include wherein if the at least one of the HE-SIG1 and the HE-SIG2 fields are absent, transmission is deferred.

Embodiments include a method receiving, by a transceiver, a plurality of physical layer frames; retrieving, by a processor, information from at least one of the physical layer frames; reading, by the processor, a robust packet bit; and processing, by the processor, the data in the at least one of the physical layer frames. Aspects of the above method include wherein the information retrieved from the physical layer frame includes at least a preamble and payload, wherein preamble includes an L-SIG field. Aspects of the above method include wherein the information retrieved further includes at least one of an HE-SIG1 and HE-SIG2 fields. Aspects of the above method include wherein the robust packet bit read resides in at least one of the HE-SIG1 and the HE-SIG 2 fields. Aspects of the above method include wherein the robust packet bit indicates the use of On-Off Keying (OOK) modulation. Aspects of the above method include wherein the robust packet bit indicates the use of eight times repetition coding (Rep8). Aspects of the above method include wherein the robust packet bit indicates the use of legacy coding and modulation. Aspects of the above method include wherein a LENGTH field within the L-SIG field indicates the use of High Efficiency (HE) Wireless Local Area Network (WLAN) transmission. Aspects of the above method include wherein if the at least one of the HE-SIG1 and the HE-SIG2 fields are absent, transmission is deferred.

Embodiments include a non-transitory computer readable medium having instructions thereon that when executed by at least one processor of a device perform a method comprising: receiving, by a transceiver, a plurality of physical layer frames; retrieving, by the processor, information from at least one of the physical layer frames; reading, by the processor, a robust packet bit; and processing, by the processor, the data in the at least one of the physical layer frames. Aspects of the above media include wherein the information retrieved from the physical layer frame includes at least a preamble and payload, wherein preamble includes an L-SIG field. Aspects of the above media include wherein the information retrieved further includes at least one of an HE-SIG1 and HE-SIG2 fields. Aspects of the above media include wherein the robust packet bit read resides in at least one of the HE-SIG1 and the HE-SIG 2 fields. Aspects of the above media include wherein the robust packet bit indicates the use of On-Off Keying (OOK) modulation. Aspects of the above media include wherein the robust packet bit indicates the use of eight times repetition coding (Rep8). Aspects of the above media include wherein the robust packet bit indicates the use of legacy coding and modulation. Aspects of the above media include wherein a LENGTH field within the L-SIG field indicates the use of High Efficiency (HE) Wireless Local Area Network (WLAN) transmission. Aspects of the above media include wherein if the at least one of the HE-SIG1 and the HE-SIG2 fields are absent, transmission is deferred.

Embodiments include a system for transmitting data frames, comprising: means for receiving a plurality of physical layer frames; means for retrieving information from at least one of the physical layer frames; means for reading a robust packet bit; and means for processing the data in the at least one of the physical layer frames. Aspects of the above system include wherein the information retrieved from the physical layer frame includes at least a preamble and payload, wherein preamble includes an L-SIG field. Aspects of the above system include wherein the information retrieved further includes at least one of an HE-SIG1 and HE-SIG2 fields. Aspects of the above system include wherein the robust packet bit read resides in at least one of the HE-SIG1 and the HE-SIG 2 fields. Aspects of the above system include wherein the robust packet bit indicates the use of On-Off Keying (OOK) modulation. Aspects of the above system include wherein the robust packet bit indicates the use of eight times repetition coding (Rep8). Aspects of the above system include wherein the robust packet bit indicates the use of legacy coding and modulation. Aspects of the above system include wherein a LENGTH field within the L-SIG field indicates the use of High Efficiency (HE) Wireless Local Area Network (WLAN) transmission. Aspects of the above system include wherein if the at least one of the HE-SIG1 and the HE-Sig2 fields are absent, transmission is deferred.

Embodiments include a method for constructing a physical layer frame, the physical layer frame comprising: creating, by a processor, a preamble, wherein the preamble includes an L-SIG field; determining, by the processor, a modulation and a coding scheme used; creating, by the processor, at least one of an HE-SIG1 and HE-SIG2 fields, wherein the at least one of the HE-SIG1 and the HE-SIG2 fields contain a robust bit; creating, by the processor, a payload field; and appending, by the processor, the at least one of the HE-SIG1 and the HE-SIG2 fields and the payload to the preamble. Aspects of the above method include wherein the modulation scheme includes On-Off Keying. Aspects of the above method include wherein the coding scheme includes eight times repetition coding.

The exemplary embodiments are described in relation to modulation and coding scheme classification using HE-SIG fields in IEEE 802.11 PHY frames. However, it should be appreciated, that in general, the systems and methods herein will work equally well for any type of communication system in any environment utilizing any one or more protocols including wired communications, wireless communications, powerline communications, coaxial cable communications, fiber optic communications and the like.

The exemplary systems and methods are described in relation to IEEE 802.11ax enabled transceivers and associated communication hardware, software and communication channels. However, to avoid unnecessarily obscuring the present disclosure, the following description omits well-known structures and devices that may be shown in block diagram form or otherwise summarized.

For purposes of explanation, numerous details are set forth in order to provide a thorough understanding of the present embodiments. It should be appreciated however, that the techniques herein may be practiced in a variety of ways beyond the specific details set forth herein.

Furthermore, while the exemplary embodiments illustrated herein show the various components of the system collocated, it is to be appreciated that the various components of the system can be located at distant portions of a distributed network, such as a communications network and/or the Internet, or within a dedicated secure, unsecured and/or encrypted system. Thus, it should be appreciated that the components of the system can be combined into one or more devices, such as an access point or station, or collocated on a particular node/element(s) of a distributed network, such as a telecommunications network. As will be appreciated from the following description, and for reasons of computational efficiency, the components of the system can be arranged at any location within a distributed network without affecting the operation of the system. For example, the various components can be located in a transceiver, an access point, a station, a management device, or some combination thereof. Similarly, one or more functional portions of the system could be distributed between a transceiver, such as an access point(s) or station(s) and an associated computing device.

Furthermore, it should be appreciated that the various links, including communications channel(s), connecting the elements (which may not be not shown) can be wired or wireless links, or any combination thereof, or any other known or later developed element(s) that is capable of supplying and/or communicating data and/or signals to and from the connected elements. The term module as used herein can refer to any known or later developed hardware, software, firmware, or combination thereof that is capable of performing the functionality associated with that element. The terms determine, calculate and compute, and variations thereof, as used herein are used interchangeably and include any type of methodology, process, mathematical operation or technique.

While the above-described flowcharts have been discussed in relation to a particular sequence of events, it should be appreciated that changes to this sequence can occur without materially effecting the operation of the embodiment(s). Additionally, the exact sequence of events need not occur as set forth in the exemplary embodiments, but rather the steps can be performed by one or the other transceiver in the communication system provided both transceivers are aware of the technique being used for initialization. Additionally, the exemplary techniques illustrated herein are not limited to the specifically illustrated embodiments but can also be utilized with the other exemplary embodiments and each described feature is individually and separately claimable.

The above-described system can be implemented on a wireless telecommunications device(s)/system, such an 802.11 transceiver, or the like. Examples of wireless protocols that can be used with this technology include 802.11a, 802.11b, 802.11g, 802.11n, 802.11ac, 802.11ad, 802.11af, 802.11ah, 802.11ai, 802.11aj, 802.11aq, 802.11ax, 802.11u, WiFi, LTE, LTE Unlicensed, 4G, Bluetooth®, WirelessHD, WiGig, 3GPP, Wireless LAN, WiMAX.

The term transceiver as used herein can refer to any device that comprises hardware, software, firmware, or combination thereof and is capable of performing any of the methods described herein.

Additionally, the systems, methods and protocols can be implemented on one or more of a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device such as PLD, PLA, FPGA, PAL, a modem, a transmitter/receiver, any comparable means, or the like. In general, any device capable of implementing a state machine that is in turn capable of implementing the methodology illustrated herein can be used to implement the various communication methods, protocols and techniques according to the disclosure provided herein.

Examples of the processors as described herein may include, but are not limited to, at least one of Qualcomm® Snapdragon® 800 and 801, Qualcomm® Snapdragon® 610 and 615 with 4G LTE Integration and 64-bit computing, Apple® A7 processor with 64-bit architecture, Apple® M7 motion coprocessors, Samsung® Exynos® series, the Intel® Core™ family of processors, the Intel® Xeon® family of processors, the Intel® Atom™ family of processors, the Intel Itanium® family of processors, Intel® Core® i5-4670K and i7-4770K 22 nm Haswell, Intel® Core® i5-3570K 22 nm Ivy Bridge, the AMD® FX™ family of processors, AMD® FX-4300, FX-6300, and FX-8350 32 nm Vishera, AMD® Kaveri processors, Texas Instruments® Jacinto C6000™ automotive infotainment processors, Texas Instruments® OMAP™ automotive-grade mobile processors, ARM® Cortex™-M processors, ARM® Cortex-A and ARIVI926EJ-S™ processors, Broadcom® AirForce BCM4704/BCM4703 wireless networking processors, the AR7100 Wireless Network Processing Unit, other industry-equivalent processors, and may perform computational functions using any known or future-developed standard, instruction set, libraries, and/or architecture.

Furthermore, the disclosed methods may be readily implemented in software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with the embodiments is dependent on the speed and/or efficiency requirements of the system, the particular function, and the particular software or hardware systems or microprocessor or microcomputer systems being utilized. The communication systems, methods and protocols illustrated herein can be readily implemented in hardware and/or software using any known or later developed systems or structures, devices and/or software by those of ordinary skill in the applicable art from the functional description provided herein and with a general basic knowledge of the computer and telecommunications arts.

Moreover, the disclosed methods may be readily implemented in software and/or firmware that can be stored on a storage medium, executed on programmed general-purpose computer with the cooperation of a controller and memory, a special purpose computer, a microprocessor, or the like. In these instances, the systems and methods can be implemented as program embedded on personal computer such as an applet, JAVA® or CGI script, as a resource residing on a server or computer workstation, as a routine embedded in a dedicated communication system or system component, or the like. The system can also be implemented by physically incorporating the system and/or method into a software and/or hardware system, such as the hardware and software systems of a communications transceiver.

It is therefore apparent that there has been provided systems and methods for IEEE 802.11ax packet classification. While the embodiments have been described in conjunction with a number of embodiments, it is evident that many alternatives, modifications and variations would be or are apparent to those of ordinary skill in the applicable arts. Accordingly, it is intended to embrace all such alternatives, modifications, equivalents and variations that are within the spirit and scope of this disclosure.

The invention claimed is:

1. A device, comprising:
    a memory;
    a transceiver, the transceiver configured to:
    receive a plurality of physical layer frames;
    a processor, the processor cooperating with the memory and configured to:
    retrieve information from at least one of the physical layer frames, wherein the information retrieved further includes at least one of an HE-SIG1 and HE-SIG2 field;
    read a robust packet bit, wherein a same value of the robust packet bit resides in each of the HE-SIG1 and the HE-SIG2 fields, the robust packet bit allowing differentiation between legacy modulation and On-Off Keying (OOK) modulation; and
    process the data in the at least one of the physical layer frames based at least in part on the robust packet bit and a constellation rotation.

2. The device of claim 1, wherein the information retrieved from the physical layer frame includes at least a preamble and payload, wherein the preamble includes an L-SIG field.

3. The device of claim 2, wherein a LENGTH field within the L-SIG field indicates the use of High Efficiency (HE) Wireless Local Area Network (WLAN) transmission.

4. The device of claim 1, wherein the robust packet bit is a zero or 1.

5. The device of claim 1, wherein the robust packet bit indicates the use of On-Off Keying (OOK) modulation.

6. The device of claim 1, wherein the robust packet bit indicates the use of eight times repetition coding (Rep8).

7. The device of claim 1, wherein the robust packet bit indicates the use of legacy coding and modulation.

8. The device of claim 1, wherein if the at least one of the HE-SIG1 and HE-SIG2 fields are absent, transmission is deferred.

9. A method comprising:
    receiving, by a transceiver, a plurality of physical layer frames;
    retrieving, by a processor, information from at least one of the physical layer frames, wherein the information retrieved further includes at least one of an HE-SIG1 and HE-SIG2 field;
    reading, by the processor, a robust packet bit, wherein a same value of the robust packet bit resides in each of the HE-SIG1 and the HE-SIG2 fields, the robust packet bit allowing differentiation between legacy modulation and On-Off Keying (OOK) modulation; and
    processing, by the processor, the data in the at least one of the physical layer frames.

10. The method of claim 9, wherein the information retrieved from the physical layer frame includes at least a preamble and payload, wherein the preamble includes an L-SIG field.

11. The method of claim 10, wherein a LENGTH field within the L-SIG field indicates the use of High Efficiency (HE) Wireless Local Area Network (WLAN) transmission.

12. The method of claim 9, wherein the robust packet bit is a zero or 1.

13. The method of claim 9, wherein the robust packet bit indicates the use of On-Off Keying (OOK) modulation.

14. The method of claim 9, wherein the robust packet bit indicates the use of eight times repetition coding (Rep8).

15. A non-transitory computer readable medium having instructions thereon that when executed by at least one processor of a device perform a method comprising:
    receiving, by a transceiver, a plurality of physical layer frames;
    retrieving, by the processor, information from at least one of the physical layer frames, wherein the information retrieved further includes at least one of an HE-SIG1 and HE-SIG2 field;
    reading, by the processor, a robust packet bit, wherein a same value of the robust packet bit resides in each of the HE-SIG1 and the HE-SIG2 fields, the robust packet bit allowing differentiation between legacy modulation and On-Off Keying (OOK) modulation; and
    processing, by the processor, the data in the at least one of the physical layer frames.

16. The non-transitory medium of claim 15, wherein the information retrieved from the physical layer frame includes at least a preamble and payload, wherein the preamble includes an L-SIG field.

17. The non-transitory medium of claim 15, wherein the robust packet bit is a zero or 1.

18. The non-transitory medium of claim 15, wherein the robust packet bit indicates the use of On-Off Keying (OOK) modulation.

19. The non-transitory medium of claim 15, wherein the robust packet bit indicates the use of eight times repetition coding (Rep8).

20. A method for constructing a physical layer frame, the physical layer frame comprising:
    creating, by a processor, a preamble, wherein the preamble includes an L-SIG field;
    determining, by the processor, a modulation and a coding scheme used;
    creating, by the processor, at least one of an HE-SIG1 and HE-SIG2 fields, wherein each of the HE-SIG1 and the HE-SIG2 fields contain a robust packet bit of the same value, the robust packet bit allowing differentiation between legacy modulation and On-Off Keying (OOK) modulation;
    creating, by the processor, a payload field; and
    appending, by the processor, the at least one of the HE-SIG1 and the HE-SIG2 fields and the payload field to the preamble.

21. The method of claim 20, wherein the modulation scheme includes On-Off Keying.

22. The method of claim 20, wherein the coding scheme includes eight times repetition coding.

* * * * *